United States Patent [19]

Bessire et al.

[11] 3,981,572

[45] Sept. 21, 1976

[54] MIRROR FOLLOW-UP DEVICE FOR A FILM PROJECTOR

[75] Inventors: Jean-Jacques Bessire; Francis Loardon, both of Bern, Switzerland

[73] Assignee: Eresa S.A., Bern, Switzerland

[22] Filed: Sept. 23, 1974

[21] Appl. No.: 508,616

[30] Foreign Application Priority Data
Sept. 24, 1973  Germany.......................... 2347931

[52] U.S. Cl................................ 352/112; 352/107
[51] Int. Cl.²................................... G03B 41/10
[58] Field of Search ........... 352/105, 106, 107, 108, 352/109, 110, 111, 112

[56] References Cited
UNITED STATES PATENTS
1,584,317   5/1926   Mechau .............................. 352/107

FOREIGN PATENTS OR APPLICATIONS
860,115   1/1941   France ............................... 352/112

Primary Examiner—L. T. Hix
Assistant Examiner—Alan Mathews
Attorney, Agent, or Firm—Oblon, Fisher, Spivak, McClelland & Maier

[57] ABSTRACT

A mirror-follow up device for a projector intended to project a continuously moving film on an image plane comprises means for pivoting the mirrors to provide optical compensation for the movement of the film, including a plate and a mirror wheel with coupling means for transmitting a rotating motion from the former to the latter, and guide means for pivoting a guide shaft associated with each mirror about an axis substantially perpendicular to a plane defined by the path of rays emanating from the projector.

7 Claims, 6 Drawing Figures

MIRROR FOLLOW-UP DEVICE FOR A FILM PROJECTOR

BACKGROUND OF THE INVENTION

1. Field of the Invention

This invention relates to a mirror follow-up device for a projector intended to project a continuously movable film upon an image plane, comprising a number of mirrors and a like number of ball-and-socket joints about each of which a mirror is pivotable as a function of the film speed for optical compensation of the movement of said film.

2. Description of the Prior Art

Projectors with optical compensation of the film movement are already known, comprising rotating polygonal prisms, where the parallel displacement of the light rays as a result of tilting of a plane parallel plate is utilized for the compensation of movement. With a prism of suitable dimensions, the virtual image produced inside is thereby kept constantly in repose, independently of the movement of the film. However, since additional image defects and discrepancies between the laws of motion of the film and of the beam of light occur, the projected image is not completely satisfactory. The use of such projectors remains essentially confined to auxiliary equipment for film production, e.g., editing tables.

Another projector with optical compensation which has also been proposed is the so-called Mechau projector, which comprises a circle of pivoting mirrors which cause the beam of light to follow the passing image and direct the moving beam coming from the image onto the screen. Via the optical system and a number of pivoting mirrors disposed therein and movable in all directions, which are situated on a rotating drum, the image from the front aperture is caused to follow the strip of film running downwards, with the aid of a prism, until a new pivoting mirror has meanwhile entered the path of rays and illuminates the next film image. The upwardly running image produced by the lens is then held steady by a pivoting mirror disposed opposite the abovementioned one and is directed onto the screen by a telephoto lens. The pivoting mirrors are disposed in a ring on the drum, which rotates around an axle, while the individual mirrors are guided in ball-and-socket joints in such a way that they guide the travel of the light beam in a corresponding manner and then cancel out this motion again. Although this projector is extraordinarily easy on the film, it has serious drawbacks. For one thing, it takes up a great deal of room, and the luminous flux obtainable is less than that of the known projectors having Maltese-cross transmissions.

SUMMARY OF THE INVENTION

It is the object of this invention to provide, for a projector of the type initially mentioned, a mirror follow-up device having fewer mirrors than are required by the known projectors of this kind for achieving the same picture quality, and taking up considerably less space than the prior art designs.

To this end, the mirror follow-up device according to the present invention further comprises a number of mirror supports corresponding to the number of mirrors, one mirror being pivotable on each mirror support, a supporting base, a bearing axle connected to the supporting base and having two parallel and staggered shaft portions, a plate rotatingly mounted on one of the shaft portions, a mirror wheel rotatingly mounted on the other shaft portion, the mirrors being attached to the mirror wheel via the mirror supports and the ball-and-socket joints, a number of coupling members corresponding to the number of mirrors and being disposed between the plate and the mirror wheel for transmitting the rotating motion of the plate to the mirror wheel, and an extended guide shaft associated with each ball-and-socket joint, each coupling member comprising a guide means for pivoting a respective guide shaft about an axis which is substantially perpendicular to a plane defined by the path of rays emanating from the projection.

BRIEF DESCRIPTION OF THE DRAWINGS

Two embodiments of the invention will now be described in detail, by way of example, with reference to the accompanying drawings, in which.

DETAILED DESCRIPTION OF THE ILLUSTRATED EMBODIMENTS

Figure 1:
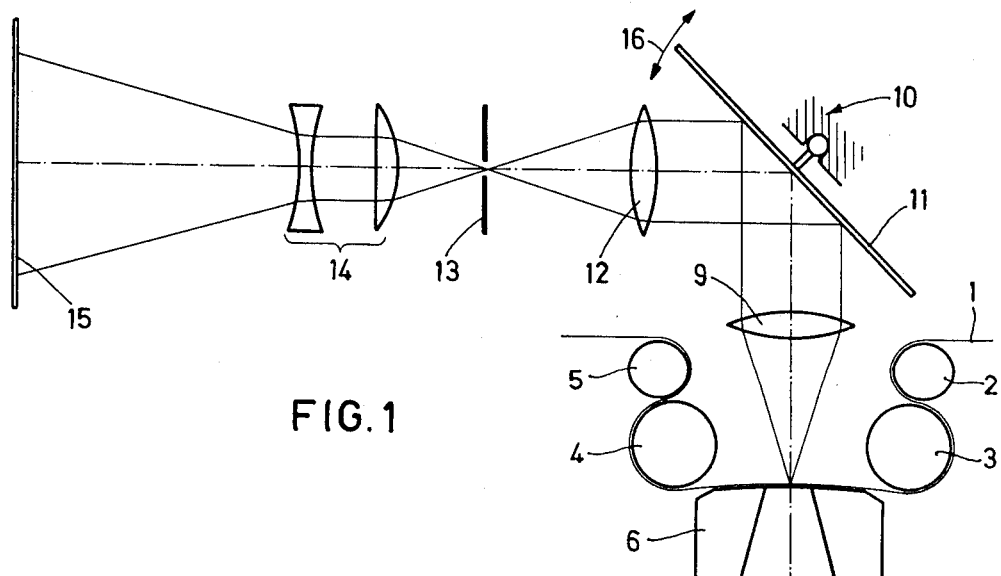
FIG. 1 is a diagram of a projector with optical compensation for projecting the film onto a screen.

In the projector according to FIG. 1, a film 1 is moved via rollers 2, 3, 4 and 5, not in a series of jerks, but at a continuous rate of speed, past an aperture 6 serving at the same time as a film trap. By means of a light source 7, the frame of the film 1 exposed by the aperture 6 is uniformly backlighted. There may also be disposed between the light source 7 and the aperture 6 a condenser, not shown for the sake of simplicity, which directs as much as possible of the light emitted by the light source 7 to the aperture 6. In the path of rays 8, and after the aperture 6, a first lens 9 is spaced from the portion of the film 1 situated in front of the aperture 6, such spacing substantially corresponding to the focal length of the lens 9. Disposed after the first lens 9 is a mirror 11 pivotingly mounted on a ball-and-socket joint 10. The mirror 11 deflects the rays emanating from a point on the illuminated film portion, which rays are substantially parallel to one another after having passed through the first lens 9, to a second lens 12. Spaced farther on at a distance corresponding exactly to the focal length of the second lens 12 is an image-limiting aperture 13. The virtual image produced in the plane of the aperture 13, comprising the picture information of two images of the film, is then projected on a screen 15 by a telephoto lens 14. Since the distance between the aperture 13 and the second lens 12 is equal to the focal length of the lens 12, the margin of the image projected on the screen 15 appears in full sharpness.

The angle through which the mirror 11 must be pivoted, indicated by an arrow 16, is a function of the follow-up distance of a point on the film 1 and of the focal lengths of the first and second lenses 9 and 12. These lenses are preferably adjusted in a fixed position to avoid the necessity of modifying the aforesaid angle for differing distances between the projector and the screen. The focusing dependent upon this distance is accomplished by means of the adjustable telephoto lens 14.

Figure 2:
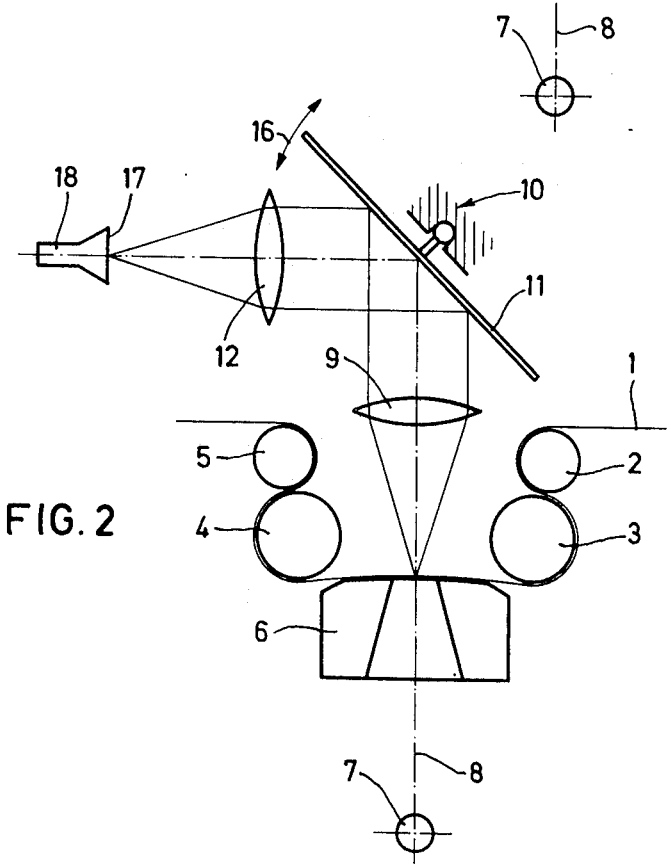
FIG. 2 is a diagram of a projector with optical compensation for projecting the film onto the screen of a pick-up tube.

The projector according to FIG. 2 is constructed substantially the same as the one in FIG. 1, and parts which are identical or which serve identical purposes are designated by the same reference numerals. In place of the image-limiting aperture 13, a screen 17 of an image pick-up tube 18 is provided, with the aid of which the image projected on this screen may be scanned.

The drive of the mirror 11 and the drive of the roller 5, designed, for example, as a driving roler, are synchronized, so that any given point of the film frame illuminated through the aperture 6 appears on the screen 15 or on the screen 17 of the pick-up tube 18, respectively, as a motionless point.

Figure 3:
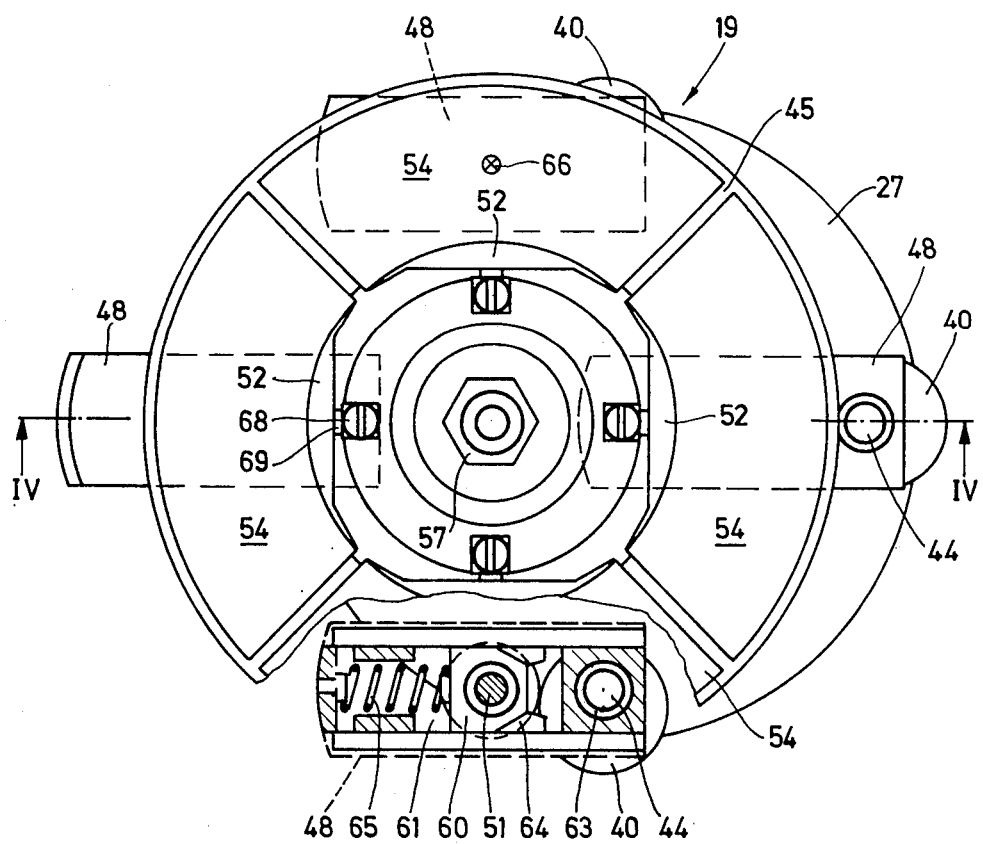
FIG. 3 is a top plan view of a first embodiment of the mirror follow-up device according to the invention, partially in section.
Figure 4:
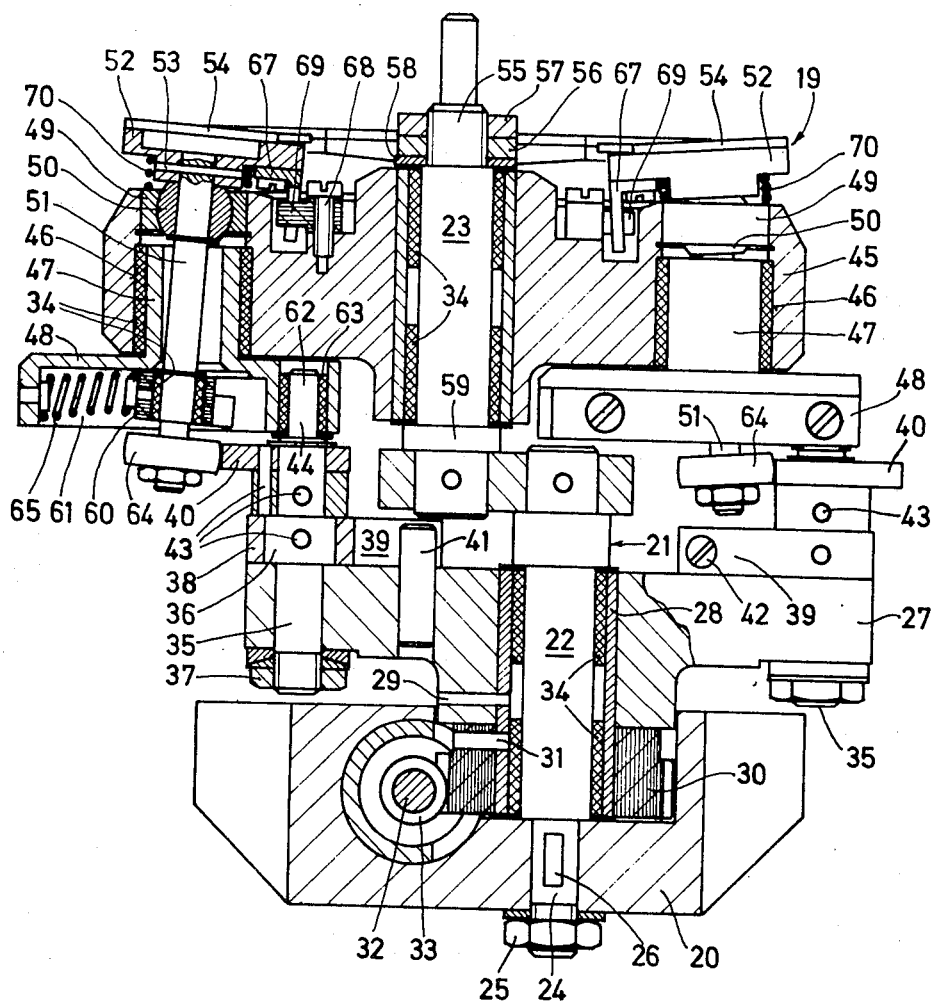
FIG. 4 is a section taken on the line IV—IV of FIG. 3.

Instead of the mirror 11 represented only symbolically in FIGS. 1 and 2, what are actually used are a number of mirrors which are alternately and successively moved transversely through the path of rays 8. An embodiment of a follow-up device 19, which moves the mirrors along a circular path and imparts a corresponding pivoting motion to them, is illustrated in FIGS. 3 and 4.

Anchored in a stationary supporting base 20 is a crank-shaped bearing axle 21 comprising two spaced shaft portions 22 and 23 running parallel to one another. A threaded extension 24 of shaft portion 22 is rigidly connected in a bore of the supporting base 20 by means of a nut 25 and a key 26. A plate 27 is mounted for rotation on the shaft portion 22. A bushing 28 is forced into a center bore in the plate 27 and secured by a pin 29 to the plate 27 so as to rotate with it. A gear wheel 30 is set onto a portion of the bushing 28 projecting above the plate 27 and is held in place by a pin 31. In order to minimize noise, the gear wheel 30 is preferably made of plastic material. A worm gear 33 for driving the gear wheel 30 and the plate 27 is mounted on a drive shaft 32 in the supporting base 20. Self-lubricating bearing inserts 34 are disposed between the shaft portion 22 and the bushing 28.

Four bolts 35, corresponding to the number of mirrors of the follow-up device 19, i.e., four mirrors in the embodiment illustrated here, are regularly distributed along a circular path. The bolts 35 comprise a broadened collar 36 and, projecting above the plate 27, a threaded end portion onto which a nut 37 is screwed. By means of the nut 37, each bolt can be rigidly connected to the plate 27 in an adjustable position. A sleeve 38, to which a lever arm 39 is secured, and an eccentric disc 40 are mounted on the portion of each bolt 35 adjacent to the collar 36. A setscrew 42, cooperating with a stop pin 41 forced into the plate 27, is screwed into the free end of each lever arm 39. The position of the eccentric disc 40 with respect to the plate 27 can be fine-adjusted by means of the setscrew 42 and then fixed with the aid of holding pins 43 and the nut 37.

A narrowed extension 44 of the bolt 35 projects beyond the eccentric disc 40 and serves as a driver for driving a mirror wheel 45 mounted on the shaft portion 23. The mirror wheel 45 comprises four bores 46 disposed concentrically about a center bore, in which bores 46 hollow journals 47 of sliding blocks 48 are rotatingly mounted. A socket 49 of a ball-and-socket joint is disposed in the end portion of each bore 46 remote from the plate 27. A guide shaft 51 extends through and is rigidly connected to a ball 50 cooperating with the socket 49 to form the ball-and-socket joint.

A mirror support 52 is set on the end of each guide shaft 51 projecting from the face of the mirror wheel 45 and is secured in place by means of a holding pin 53. A plane mirror 54 in the shape of a sector of an annulus is fastened to each of the four mirror supports 52.

The end of the shaft portion 23 projecting above the mirror wheel 45 is provided with a thread 55 on which a nut 56 and a check nut 57 are screwed. The mirror wheel 45 is mounted rotatingly, but not axially displaceably, between a washer 58 and a collar 59 of the shaft portion 23.

Each of the sliding blocks 48 has an elongated recess 61, serving as a guide for a slide 60, and a bore 62 with a bushing 63 for receiving the extension 44 of the bolt 35. When the distance between the axis of rotation of the journal 47 and the extension 44 is exactly equal to the distance between the longitudinal axes of the two shaft portions 22 and 23, then the longitudinal axes of the sliding blocks 48 are aligned parallel to one another in every position of the plate 27 and the mirror wheel 45, respectively, as may be seen in FIG. 3.

The other end of the guide shaft 51 passes through the slide 60, and mounted on the end of the guide shaft 51 projecting beyond the slide 60 is a rotatable roller 64 which rolls on the outer face of the associated eccentric disc 40. The roller 64 is pressed against the eccentric disc 40 by means of a spring 65 which acts upon the slide 60.

According to the position of the eccentric discs 40 with respect to the rollers 64, the slides 60 are moved from the left-hand position, shown on the left of FIG. 4, into the right-hand position, shown on the right of that figure, the guide shafts 51 thereupon rotating about the shaft portion 23 and swivelling in planes parallel to the longitudinal axis of the shaft portion 23. This swivelling motion is transmitted to the mirrors 54 rigidly secured to the other ends of the guide shafts 51. The mirrors 54 are thereupon rotated on a circular path about the shaft portion 23, but in every position of the mirror wheel 45, the planes of the mirrors 54 remain perpendicular to the plane defined by the path of rays 8. The reference numeral 66 symbolically represents the reflection point for the center light beam of the path of rays 8.

In order to prevent the mirrors 54 from being able to rotate about the longitudinal axes of the guide shafts 51 with respect to the mirror wheel 45, a guide angle piece 67 is secured to each mirror support 52. One leg of the angle piece 67 takes the form of a fork, and each such fork embraces a projection 69 secured to the mirror wheel 45 by a screw 68. A spring 70 for compensating any possible play in the ball-and-socket joint is further provided between each mirror support 52 and the associated socket 49.

All bearing locations are preferably lines with self-lubricating bearing inserts 34, whereby maintenance is kept to a minimum. Ball bearings might also be used instead of these bearing inserts.

The mirror 11 symbolically represented in FIGS. 1 and 2 is actually one of the mirrors 54, viz., the one which is at the moment situated in the path of rays 8. The follow-up device illustrated in FIGS. 3 and 4 comprises four mirrors 54, but only three mirrors or more than four mirrors might also be provided. The number of mirrors must merely be taken into account in the construction of the gearing (not shown) which couples the drive roller 5 for advancing the film 1 and the drive shaft 32 which drives the plate 27 and hence the mirror wheel 45.

Figure 5:
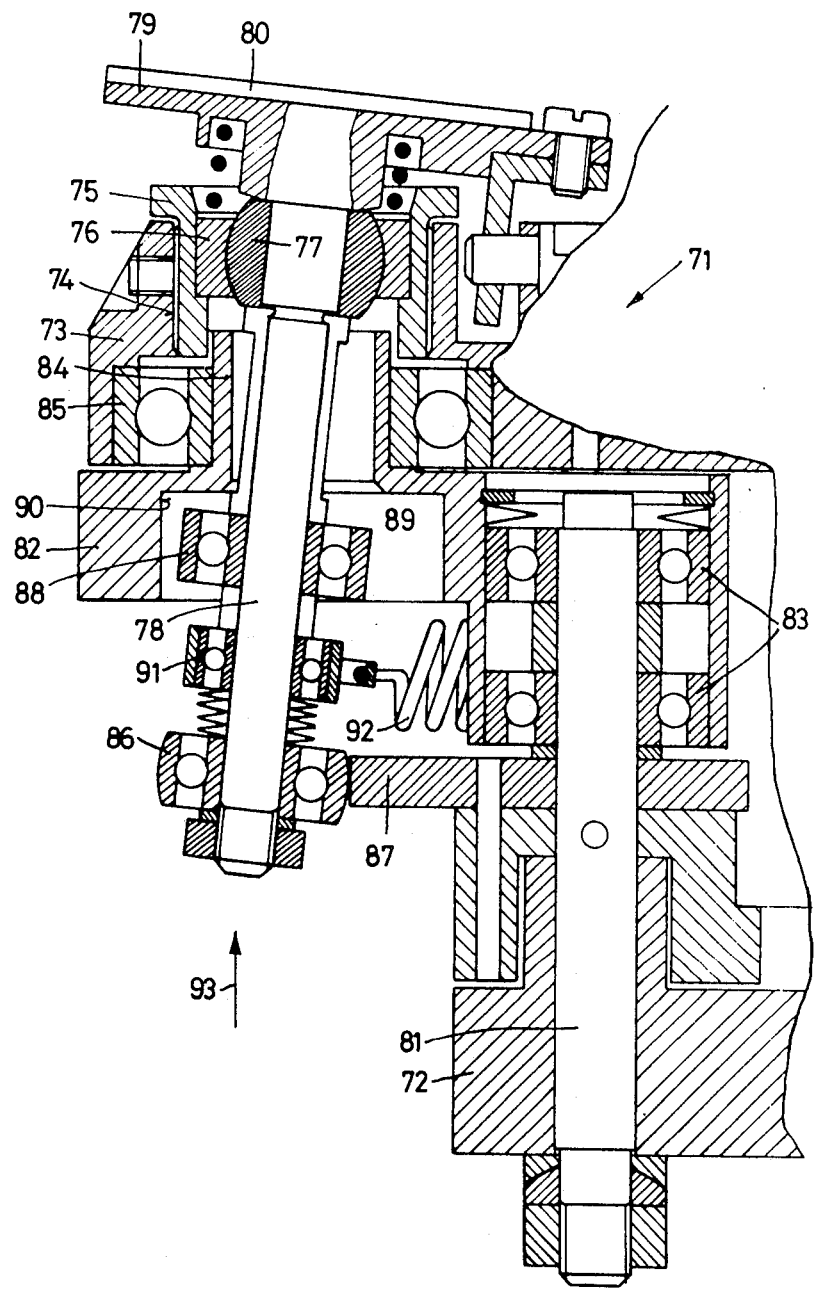
FIG. 5 is a partial sectional view of a second embodiment of the invented device, drawn on a large scale.

FIG. 5 shows a section of part of another embodiment of a follow-up device 71, drawn on a larger scale. Only the peripheral areas of a plate wheel 72 and a mirror wheel 73 are visible. A sleeve 75 supporting a socket 76 of a ball-and-socket joint is screwed into a multi-stepped bore 74 in the mirror wheel 73. The socket 76 surrounds a ball 77 of the ball-and-socket joint, which ball is rigidly mounted on a guide shaft 78. The upper end of the guide shaft 78 is rigidly connected to a mirror support 79, on which a mirror 80 is secured. Like the follow-up device illustrated in FIGS. 3 and 4, the follow-up device 71 comprises four mirrors 80.

A bolt 81 is mounted in the plate wheel 72 so as to rotate therewith. A coupling member 82 is rotatingly mounted via a ball bearing 83 on the portion of the bolt 81 projecting above the plate wheel 72. The follow-up device 71 preferably comprises four such coupling members 82, only one of which is shown in FIG. 5. The coupling member 82 comprises a hollow journal 84 which projects into the stepped bore 74 and is connected to the mirror wheel 73 via a ball bearing 85. The guide shaft 78 extends through the hollow journal 84 and bears at its free end a roller 86 which cooperates with an eccentric disc 87 mounted on the bolt 81. Mounted on the guide shaft 78 at the middle portion thereof is a ball bearing 88 which is situated in a recess 90 of the coupling member 82 limited by a guide wall 89 and which rests again the inside of the guide wall 89.

A tension spring 92 is hooked to a mounting support 91 rotatingly disposed on the guide shaft 78 between the roller 86 and the ball bearing 88. The spring 92 pulls the lower portion of the guide shaft 78 diagonally to the rear as viewed in FIG. 6, i.e., towards the eccentric disc 87 on the one hand and towards the guide wall 89 on the other hand. Hence the roller 86 always rests against the eccentric disc 87, and the ball bearing 88 always rests against the inside of the guide wall 89, so that the guide shaft 78 can be moved by the eccentric disc 87 only in a plane parallel to the guide wall 89. Thus the mirror 80 can likewise be pivoted only about an axis perpendicular to the plane of the guide wall 89.

Figure 6:
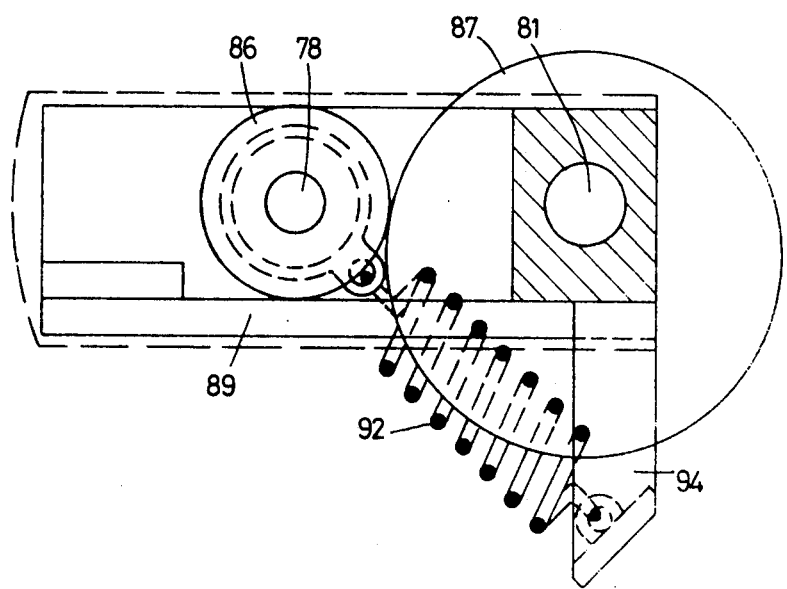
FIG. 6 is an operating diagram of the follow-up elements of the embodiment shown in FIG. 5.

FIG. 6 shows a diagram of the manner in which the elements cooperate which are responsible for the swivelling motion of the guide shaft 78 described above. This figure indicates a view looking down towards the coupling member 82 in the direction of an arrow 93 in FIG. 5. The other end of the tension spring 92 is hooked to an arm 94 of the coupling member 82, so that a first component of the force emanating from the spring 92 acts in the direction of the guide wall 89 and a second component in the direction of the eccentric disc 87.

During the projection of a film, a mirror 54 or 80 is caused to follow one of the images for more than one frame height, preferably for two frame heights. The next mirror is caused to follow the next image, both images being projected exactly on top of one another for at least part of the time on the screen 17 of the pick-up tube 18 or on the screen 15. There is no loss of light upon the transition from the preceding image to the following one because the preceding image disappears from the area of the aperture 6 to the same extent that the following image enters that area, and hence the sum of the average brightness remains constant.

The pictures projected by means of the projector described above are flicker-free, of high light intensity, and sharp-edged.

Since the invention described above makes it possible to provide a very compact follow-up device, the speed of projectors equipped with such devices can be increased to more than 150 frames per second; and even at this high speed, the film is saved from wear and tear because it is moved past the aperture, not in jerks, but at a uniform rate of speed.

The aforementioned advantages broaden the field of application of the projector described. Besides enabling faultless projection on a screen, this projector lends itself admirably for use in so-called film-scanners (see FIG. 2) and for auxiliary equipment in film production.

Since the mirrors 54 and 80 are each in the shape of a sector of an annulus, the actual effectiveness of the individual mirrors can be expanded to cover a greater angle of rotation of the mirror wheel 45 or 73. This makes it possible to use substantially fewer mirrors than is the case with known projectors.

What is claimed is:

1. A mirror follow-up device for a projector intended to project a path of light rays of a continuously movable film upon an image plane, comprising:

a plurality of mirrors and a like number of mirror supports;

a plurality of ball and socket joints about each of which one of said mirrors is pivotable on one of said mirror supports;

a supporting base;

a bearing axle connected to said supporting base and having two parallel and staggered shaft portions;

a plate rotatingly mounted on one of said shaft portions;

a mirror wheel rotatingly mounted on the other of said shaft portions, said mirrors being attached to said mirror wheel through said mirror supports and said ball and socket joints;

a plurality of coupling means corresponding to the number of said mirrors and being connected between said plate and said mirror wheel for transmitting the rotating motion of said plate to said mirror wheel; and a plurality of extended guide shafts, each of said guide shafts being connected adjacent one end thereof with a respective one of said ball and socket joints; and wherein each of said coupling means comprises a sliding block disposed perpendicular to said bearing axle and having an elongated recess therein, a slide displaceable within said recess for supporting a respective one of said guide shafts, an eccentric disc rigidly connected to said plate, a roller rotatingly mounted at the free end of said respective one of said guide shafts and cooperating with said eccentric disc, and a spring for pressing said roller against said eccentric disc, whereby said respective one of said guide shafts is pivoted about an axis which is substantially perpendicular to a plane defined by the path of rays emanating from said projector.

2. A device in accordance with claim 1, wherein each of said sliding blocks is rotatingly connected to said plate on the one hand and to said mirror wheel on the other hand, the distance between the axes of rotation of these connections being equal to the distance between the longitudinal axes of said shaft portions.

3. A device in accordance with claim 2, wherein each of said eccentric discs is disposed on a bolt anchored in said plate and each of said sliding blocks is rotatingly mounted on a portion of a respective one of said bolts projecting above said eccentric disc, and further comprising means for adjusting said eccentric disc with respect to said plate.

4. A device in accordance with claim 3, wherein each of said sliding blocks comprises a hollow journal through which said respective one of said guide shafts extends and by means of which said sliding block is rotatingly mounted on said mirror wheel.

5. A device in accordance with claim 1, wherein blocking means are disposed on each of said mirror supports and on said mirror wheel to prevent said mirrors from rotating about said guide shafts.

6. A device in accordance with claim 1, wherein a gear wheel is rigidly connected to said plate, a drive shaft is mounted in said supporting base, and a worm gear meshing with said gear wheel is fastened to said drive shaft for driving said plate.

7. A device in accordance with claim 1, wherein each said mirror comprises a plane reflective surface in the shape of a sector of an annulus.

* * * * *